(12) United States Patent
Lai et al.

(10) Patent No.: US 6,571,270 B1
(45) Date of Patent: May 27, 2003

(54) TIMEOUT DETECTION FACILITY

(75) Inventors: Robert S. Lai, San Jose, CA (US); Richard Schneider, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/267,356

(22) Filed: Mar. 15, 1999

(51) Int. Cl.[7] .................................................. G06F 9/52
(52) U.S. Cl. ...................................... 709/101; 707/202
(58) Field of Search ................................. 709/100–108; 714/37; 707/1–10, 202; 713/502; 710/200, 220, 240–244

(56) References Cited

U.S. PATENT DOCUMENTS

| | | | | |
|---|---|---|---|---|
| 5,095,421 A | * | 3/1992 | Freund ........................ | 709/101 |
| 5,835,766 A | * | 11/1998 | Iba et al. ..................... | 709/104 |
| 5,845,117 A | * | 12/1998 | Fujita ......................... | 709/107 |
| 6,041,425 A | * | 3/2000 | Kokunishi et al. ............ | 714/37 |
| 6,223,200 B1 | * | 4/2001 | Barnes et al. ................ | 709/100 |
| 6,226,377 B1 | * | 5/2001 | Donaghue .................... | 709/101 |
| 6,374,282 B1 | * | 4/2002 | Bunton et al. ............... | 709/101 |

OTHER PUBLICATIONS (No author given) "Concurrency Control Service Proposal" OMG TC Document 93.11.8, Transarc Corporation, pp. 11, 24, 35, published 1993.*

Yeung et al. "A New Deadlock Detection Algorighms for Distributed Real–Time Database Systems". IEEE, 1995.*

* cited by examiner

*Primary Examiner*—St. John Courtenay, III

(57) ABSTRACT

In an IMS/ESA environment, an ITASK is provided so as periodically to check IMS application programs to determine whether any is hung, thus providing notification for hung transactions that sometimes occur after an asynchronous APPC call issued by IMS from the IMS dependent region during syncpoint processing. APPC calls cause a time stamp to be written, which is used by the ITASK to determine how long the transaction is in a response wait state. The ITASK is reactivated after a waiting period dynamically determined on the basis of the processes active and a minimum interval. Detection of hung transactions results in a remedial action being taken.

12 Claims, 4 Drawing Sheets

TIMEOUT DETECTION FACILITY

BACKGROUND OF THE INVENTION

1. Field of the Invention

This invention relates to a method, computer system, and computer program product that relates to the database management system IMS® available from INTERNATIONAL BUSINESS MACHINES CORPORATION®.

More particularly, this invention relates to solving a problem in that transactions sometimes hang after an asynchronous APPC call issued by IMS from the IMS dependent region during syncpoint processing.

2. Related Art

The following discussion provides the necessary background to understand the invention.

IMS/ESA

IMS/ESA (Information management system/Enterprise systems architecture) provides for a continuous link to information stored in databases. IMS/ESA provides access to critical data, keeping data accurate and consistent while providing timely access to many end users.

There are two major parts to IMS/ESA: a database system (IMS Database or IMS DB), and a data communications system (IMS Transaction Manager or IMS TM). Together, they create a complete online transaction processing environment providing continuous availability and data integrity.

IMS/ESA runs under the MVS/ESA or OS/390 operating systems, which run on the S/390 platform.

IMS DB

At the heart of IMS DB are its databases and its data manipulation language, Data Language/I (DL/I) IMS databases are hierarchic collections of data, information organized in a pyramid fashion with data at each level of the hierarchy related to, and in some way dependent upon, data at the higher level of the hierarchy. DL/I calls provide for the creation and manipulation of these IMS databases.

The IMS DB function provides a full-function resource manager and a fast path resource manager for hierarchical database management. These resource managers map the data language (DL/I) application call interface to the underlying operating system access methods. This mapping enables the application code to function independently of operating system access methods and to remain transparent to the physical storage of the data. The data managed by IMS are organized in hierarchical database records. A database record is composed of segments, a segment being the smallest piece of information that IMS can store. A segment contains fields that are the smallest pieces of data an application program can manipulate. A field identified as a unique key field can be used to navigate the database to find a specific segment. The hierarchical structure of the segments establishes the structure of the database record. A root segment identifies a database record, and a database record cannot exist without a root segment. Dependent segments are the pieces of data that complete the rest of a database record. The IMS DB full-function resource manager provides sequential access, indexed sequential access, and direct access for database processing. The fast path DB resource manager provides the direct method for processing data by using direct access pointers to the segments.

IMS TM

IMS transaction manager (TM) is a message-based transaction processor that is designed to use the OS/390 or MVS/ESA environment to advantage. IMS TM provides services to process messages received from the terminal network (input messages) and messages created by application programs (output messages). It also provides an underlying queuing mechanism for handling these messages.

TM provides for a variety of online processing options. For example, transactions may be defined for high-volume data-entry applications, for interactive applications, or to support predefined queries. IMS TM supports a wide variety of terminals and devices. It also enables the development of a wide range of high-volume, rapid-response applications, and the dispersal of data processing locations geographically, while keeping centralized control of databases.

Transactions

A transaction is a specific set of input data that triggers the execution of a specific process or job. A message destined for an application program and the return of any results is considered by IMS TM to be one transaction. IMS TM running with IMS DB is designed to handle thousands of transactions per second.

Data Integrity

One of the fundamental concepts supported by IMS DB is the concurrent update capability from multiple application programs. IMS DB contains a program isolation local lock manager to support concurrent application program processing. The local lock manager controls access to the database records to ensure data integrity by preventing duplicate access to the same record until the application program completes its processing of the record. The database record is locked when a position is first obtained on is the record. The item locked is the root segment. The database record is locked until position is changed to a different database record or until the application program reaches a commit point.

Because data are always accessed hierarchically, when a lock on a root segment is obtained, IMS determines whether any application programs hold locks on dependent segments. If there are no locks on dependent segments, it is not necessary to lock dependent segments when they are accessed. When an application program updates a segment, the segment, not the database record, is locked. IMS DB uses the Internal Resource Lock Manager (IRLM) global lock manager to support the global sharing of databases across systems in a sysplex (discussed below). When the IRLM is used, no lock is obtained when a dependent segment is updated. Instead, the root lock is held at single update level when exiting the database record. Therefore, no additional locks are required if a dependent segment is inserted, deleted, or replaced. This establishes the foundation for two-way data sharing and N-ways data sharing in a System/390 (S/390) Parallel Sysplex cluster.

Another key aspect of data integrity is recovery. The IMS logger function provides recovery and restart capability for the system. IMS logs the following events:

When IMS starts up and shuts down
When application programs start and terminate
Changes made to the database
Communication messages received and responses sent
Application program checkpoints
System checkpoints The IMS logger writes log records to a direct access storage device (DASD) logger to support high-volume traffic. IMS first writes log records to a high-speed DASD data set called the Write-Ahead Data Set (WADS). When IMS fills a DASD track on the WADS, IMS copies the entire track to another DASD data set called the Online Log Data Set (OLDS). When IMS is close to filling the last available OLDS, it archives the full ones to System Log Data Sets (SLDSs). While the Log Archive utility is creating an SLDS, it can also create a Recovery Log Data Set (RLDS). The RLDS contains only the log records needed for database recovery. The Database Recovery Control (DBRC) facility is used to support log management, database recovery control, and data sharing.

DBRC automatically records all log data sets produced by the on-line IMS subsystem and by log archiving jobs in a pair of Key-Sequenced Data Sets (KSDS) called RECON (recovery control). IMS uses this information for database recovery jobs if databases are registered and also for IMS restart. DBRC also tracks the archiving requirements of the on-line data set (OLDS) and, if requested, generates and submits the Job Control Language (JCL) for archiving jobs.

DBRC also records:

Database image copies

Database reorganizations

Database recoveries

Accumulations of database changes

Backouts of database changes

Because DBRC records this information in the RECON, DBRC can generate JCL for executing a database recovery.

Data sharing requires that the databases be registered with DBRC. DBRC checks on whether subsystems have authority to perform the requested task and whether other subsystems are not currently reserving the database. Concurrent access to databases by systems in one or more processors is controlled with a common (shared) DBRC RECON data set. To maintain data integrity, status indicators in the RECON data set control concurrent access and recovery actions for the databases. This common RECON data set is required in a data-sharing environment so that a given database is identified to all the sharing subsystems.

IMS Architectural Structure and Flow

IMS preserves the ability of the application program to process data, even application programs written decades ago.

There is one control region (process) for each IMS system. This region is the heart and brain of the IMS system: it controls the message queues, scheduling of applications, recoveries, and so on. Each IMS system also has one or more dependent regions. The control and dependent regions are brought up and kept up until IMS needs to come down. IMS applications are processed within the dependent regions.

The fundamental architecture of IMS thus consists of a control region, a DLI secondary address space (DLISAS), a DBRC address space, an IRLM address space, and one or more dependent regions.

The control region, to elaborate, is the execution environment for the IMS system software, the control blocks, and storage pools required for managing communication access and application program scheduling. The control region also contains the fast path system software for managing access to fast path databases. This isolates the IMS system functions from customer application programs to maintain the integrity of the IMS system. The DLISAS execution environment contains the IMS DB full-function system software, control blocks, and storage pools for managing access to the full-function databases.

The dependent regions provide the execution environments for the application programs to process transactions. IMS schedules a customer's application programs in the dependent regions to provide for parallel processing and a separation of application program processing. The scheduling of an application program in its own dependent region also provides application program integrity. When a transaction message arrives in the IMS control region, the IMS scheduling function checks for a dependent region that is available for running the application program. The available dependent region is supplied with the name of the application program to be loaded and executed in the dependent region. The application program uses the DL/I calls for message queue processing to retrieve the message from the message queue and to process the request. When the application program completes the processing of the request, this indicates the completion of the unit-of-work, and the IMS sync-point manager initiates the two-phase commit process. During sync-point processing (also referred to as syncpoint processing), IMS creates a log record to establish commitment of database changes and availability of output messages. The commit process is not complete until IMS physically writes this log is record to the OLDS.

For Phase 1, the IMS resource managers are asked to commit updates, and for Phase 2 the IMS resource managers are told to commit or abort the changes. After the IMS sync-point manager completes the two-phase commit process, the IMS transaction manager (TM) will check on whether there are any more work requests for the application program. If no additional work is ready to be processed, IMS TM determines whether the region can become pseudo wait-for-input (pseudo WFI). If the region is eligible for pseudo WFI, the region remains scheduled for the transaction and waits until another message is entered for the region. If the next message is for the scheduled transaction, the message is passed to the application program. If the next message is for a different transaction, IMS TM terminates the application program and schedules a new application program to process the new message. This self-tuning technique is used to maximize the use of a dependent region by an application program. The ability to support multiple dependent regions facilitates workload balancing and application program isolation. IMS distributes the workload among processors by off-loading some of the IMS control region task control block (TCB) work to dependent region TCBs.

The following functions operate in dependent region TCBs using the cross-memory facility of the Multiple Virtual Storage (MVS*) operating system to communicate with the IMS control region for:

Application program scheduling

Application program DL/I calls

Application program sync-point processing

Application program termination

This enables efficient CPU use. The IMS multiaddress space architecture exploits the multiprocessing architecture of MVS and the transformation of the S/390 platform to the S/390 Parallel Enterprise Server. The IMS control region also provides the functions that support communication access.

Communication Access

A key concept supported by the IMS transaction manager is to view communication devices and end users in a logical fashion. This concept provides transparency for the application program and security for end-user messages. The application program does not have to know the characteristics of the communication device when sending data to or receiving data from the device. The IMS TM function uses the message queue resource manager and expedited message handler (EMH) resource manager to manage the communication messages to be processed by the application program. These resource managers support the DL/I communication message application call interface to provide a communication message to the application. The IMS TM resource managers use the concept of a message segment to manage a communication message, and multiple message segments can be used to support a complete communication message. The application programs use the DL/I interface to receive and send message segments. Another key function of message segments is to provide network transparency to the application programs. The IMS TM resource managers use the IMS TM communication functions to interface to the network protocols for communication message processing.

The IMS TM communication manager function supports the S/390 Virtual Telecommunications Access Method (VTAM). The communication manager is the interface between the message queue and EMH resource managers and VTAM. IMS TM also provides a multiple systems coupling (MSC) feature. MSC is a private IMS TM protocol that only permits the coupling of IMS systems to other IMS systems. MSC is an extension of the IMS TM communication and scheduling capabilities and enables the user to perceive one virtual IMS system while the transactions are being routed across a complex of IMS subsystems. The MSC function can be used to provide workload distribution across a single system boundary or across geographical boundaries.

IMS TM can also be used to access other types of database subsystems using the external subsystem attach facility (ESAF). ESAF gives application programs running in IMS dependent regions the capability to obtain data from external subsystems, such as DATABASE 2 (DB2).

Open IMS Access

An MVS systems complex may be referred to as a sysplex. A base sysplex provides the cross-system coupling facility (XCF) component of Multiple Virtual Storage/Enterprise Systems Architecture (MVS/ESA). XCF services allow authorized applications on one system to communicate with applications on the same system or on other systems.

To enable cooperative application processing, there is provided the IBM Systems Network Architecture Logical Unit 6.2 (SNA LU 6.2) Advanced Program-to-Program Communications (APPC) protocol. IMS TM supports the APPC protocols but still preserves the existing application program interface. IMS TM utilizes the APPC/MVS facilities to enable APPC support. APPC/MVS and APPC/IMS are one of the authorized application pairs to implement the XCF protocols for communication. APPC/MVS uses APPC/VTAM macros to communicate with the communications network and uses XCF to communicate with APPC/IMS. An IMS application program can also use APPC/MVS services for direct communication processing. The coordination of processing between two APPC programs is known as the synchronization level (sync_level). APPC sync_level defines the protocol that is used when changing conversation states. APPC and IMS support the following sync_level values:

NONE—Specifies that the programs do not perform synchronization;

CONFIRM—Specifies that the programs can perform confirmation processing on the conversation; and SYNCPT—Specifies that the programs participate in coordinated commit processing.

IMS requires the Operating System/390 (OS/390) Resource Recovery Services (RRS) as the syncpoint manager (SPM) when a conversation with sync_level=SYNCPT is established. RRS controls the commitment of protected resources by coordinating the commit or backout request with the participating owners of the updated resources, the resource managers. IMS is thus the resource manager for DL/I, fast path data, and the IMS message queues. The application program decides whether the data are to be committed or aborted, and communicates this decision to the SPM. The SPM then coordinates the actions in support of this decision among the resource managers. IMS interfaces to RRS to provide for coordinated commit. IMS assumes the role of a participant in the two-phase commit process with the sync-point manager, RRS.

XCF services now provide a standard MVS sysplex communication protocol. In view thereof, there is provided for IMS an Open Transaction Manager Access (OTMA) function. The OTMA function uses XCF application programming interfaces to define a transaction pipe (TPIPE) connection between an OTMA client and IMS TM OTMA server function. The TPIPE supports a full-duplex protocol. An OTMA client is an MVS application program that sends transactions to an IMS server and receives the output. The MVS application program must be a member of an XCF group that includes IMS and uses the OTMA protocol. OTMA also works with RRS to support coordinated commit processing. In an OTMA environment, OTMA is not a resource manager registered with RRS. The process remains an interprocess protocol between a server (IMS) and a number of clients (application programs) The client-adapter code that uses OTMA is responsible for obtaining and owning the context identifier (ID). In messages passed to OTMA, the context-ID field represents the sync_level= SYNCPT request. When IMS finds the context-ID in the message, IMS assumes the role of a participant in the two-phase commit process, as it does in the APPC environment.

The IMS TM OTMA server function interfaces to the message queue resource manager and the EMH resource manager for delivery of messages to or from application program processing. Since the existing application programs use the DL/I call interface for their message processing requests, they continue to run transparent to the communication protocol supported by the OTMA client interface. The OTMA function opens IMS to access with other communication protocols.

Internet

In view of the use of Transmission Control Protocol/Internet Protocol (TCP/IP) as a network protocol, IMS provides a TCP/IP OTMA connection (ITOC) client function. ITOC runs as an authorized MVS application program. ITOC provides support for user exit routines that can be used by TCP/IP clients to access IMS. ITOC defines a message prefix that is used to identify the user exit routine and a standard interface for calling the user exit routine.

To support Internet and the World Wide Web application, there is provided "IMS Connectors", which help enable access to enterprise applications and data over the Internet using a Web browser. The ITOC is one of four IMS Connectors that are provided for communication access to IMS.

The interface to IMS TM for the four IMS Connectors for communication access enables DL/I message processing application programs to continue to process without change. The opening of access to IMS also requires the ability to access IMS DB.

The IMS Object Connector provides a way to access IMS DB managed data. Object-oriented application programs can use IMS Object Connector to access data managed by IMS. The object-oriented applications can be either IMS DB batch or IMS TM applications. Object-oriented application programs can also be invoked from a Web browser. The IMS Object Connector can use the IMS Open Data Base Access (ODBA) callable interface to access IMS DB. The ODBA connection interface enables any OS/390 application program to access the IMS DB full-function and fast path databases and to use RRS to provide the commit or backout coordination of database updates.

IMS in an S/390 Parallel Sysplex

In an S/390 Parallel Sysplex, IMS DB resource managers support block-level multisystem data sharing. The resource managers can also exploit coupling facility cache structures for database buffer management. This enhances the sharing of databases by multiple IMS systems. The IRLM lock manager uses the coupling facility lock structures to provide the block-level locking of IMS databases.

IMS TM supports message queue sharing by using the coupling facility list structures. Multiple IMS systems can access and process messages on the shared message queue. IMS provides the Common Queue Server (CQS) to manage the queues in the coupling facility list structures. CQS has a structured interface that enables other programs besides IMS to connect to it and process the shared message queues. To fully utilize the Parallel Sysplex, IMS systems may be defined as clones. A cloned IMS system configuration is one in which the same application system resources (including transactions, programs, and databases) are shared among multiple IMS systems operating in a Parallel Sysplex configuration that is also sharing a common transaction workload. Transactions executing in such a configuration should have access to a common set of DL/I databases through IMS Nways or two-way data sharing.

The multisystem data sharing and message queue sharing provides the following capabilities when using the S/390 Parallel Sysplex:

Automatic workload balancing—All IMS systems in the sysplex can automatically process workload by using shared queues.

Incremental growth—As workload increases, new IMS systems can be dynamically added to the sysplex to process the extra workload. This approach supports peak processing periods.

Increased reliability—If any IMS system in the sysplex fails, any of the remaining IMS systems can process the workload in the shared queues. If one or more of the IMS systems requires a cold start, the contents of the shared queues are not affected.

LU 6.2

LU 6.2 is best understood in the context of the Systems Network Architecture (SNA).

SNA is both an architecture and a protocol suite. One function of SNA is to define the rules and message formats by which application programs executing on a PU type 5 (mainframe host) communicate with peripheral devices.

In SNA, a logical unit is an addressable end-point which may participate in a data communications session. A logical unit is also referred to by its acronym, LU. Multiple logical units may be associated with an individual physical unit. Examples of logical units include data entry terminals, printers, and application programs.

SNA defines several types of logical units. A logical unit type is a profile of how a logical unit is expected to interact with another logical unit. For example, logical unit type 2 is a data entry terminal. The SNA definition of logical unit type 2 sets parameters for the elements of the SNA protocols that may be used with logical unit of this type. Not all protocol operations available within SNA are appropriate for use when one of the end-points in a session is a data entry terminal. By defining the profile of a logical unit type, the application software which interacts with such a logical unit need only be concerned with a narrower scope of possible operations.

A logical unit type defines a profile describing a generic type of end-point within an SNA environment.

LU 6.2 defines an intelligent device supporting program-to-program communications.

All application-level data is transmitted back and forth on an LU-to-LU session. An LU-to-LU session is established between two logical units. These logical units must be of the same type. An example of an LU-to-LU session is a session between a terminal and an application program on the mainframe. In this example session, one of the LU partners in this session is the terminal device itself. The executing instance of the application program which is presenting information on the terminal display, and processing user input, is also considered a logical unit. Because both partners in this session are of the same type, both end-points have fixed knowledge as to the capabilities of the other end-point.

SNA also defines the rules and message formats by which application programs on separate processing systems communicate with each other. Application Program Interfaces (API's) are defined for inter-program communications in an SNA environment. An API defines the functional procedures by which a user-written program manages a session with another program, and by which it interchanges messages with that other program. Standard SNA API's include HLLAPI, APPC, and CPI-C.

The Problem

A problem exists, however, in that transactions sometimes hang after an asynchronous APPC call issued by IMS from the IMS dependent region during syncpoint processing.

SUMMARY OF THE INVENTION

It is the objective of this invention to solve this problem. The objective is achieved by a new ITASK (an ITASK is similar to a process) that periodically checks to determine whether any IMS application program is in a wait for a response from an APPC device. Hereafter, "ITASK" and detection process may be used interchangeably.

The invention will be better understood from the following description in which an exemplary embodiment is described in detail with the aid of the accompanying figures. It is to be understood that the described embodiment is merely an example of the realization of the invention and is for explanation only. In other words, the invention is not limited in its applicability to this one example.

BRIEF DESCRIPTION OF THE DRAWING FIGURES

DETAILED DESCRIPTION OF THE PREFERRED EMBODIMENT

Figure 1:
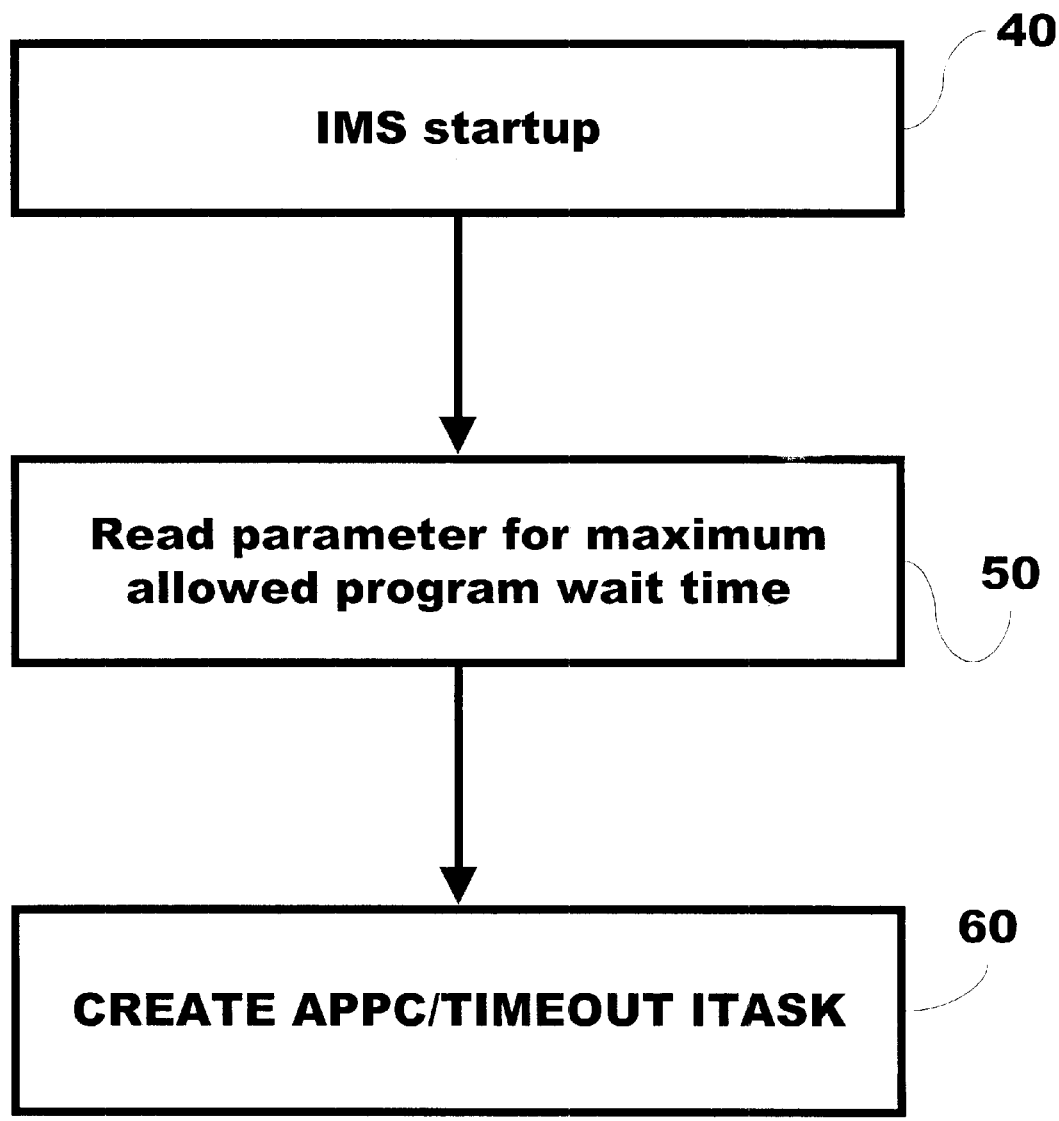
FIG. 1 shows, in a simplified manner, a portion of the processing according to the invention.

The IMS/ESA Transaction Manager (TM) handles operations relating to messages, transactions and message queues. It manages a network of IMS terminals, routes messages between terminals and applications, queues input and output messages, schedules application programs, and provides various other system control facilities.

IMS/ESA includes a function called IMS/APPC (Advanced Program-to-Program Communication). APPC provides enhanced SNA support for distributed processing. Specifically, APPC describes the protocols used by programs in separate processors to communicate with each other in the execution of a (single) distributed transaction. IMS/APPC support enables IMS to participate in open and distributed environments by providing additional connectivity capability and LU 6.2 device or platform independence. IMS/APPC supports IMS applications in three general forms.

Existing Application Programs: Implicit Support

IMS application programs execute unchanged in the IMS dependent region when invoked from LU 6.2 devices using APPC. IMS issues all APPC verbs or CPI communication calls on behalf of IMS application programs.

New or CPI Communications Programs: Explicit Support

A new CPI application program is designed to use APPC verbs or CPI communication calls directly.

Modified Programs

When an existing application needs to add the capability to establish an APPC conversation while executing under IMS, the program is described as a modified standard DL/I application program.

To complement IMS/APPC support, IMS/ESA includes OTMA (Open Transaction Manager Access). OTMA is a transactional-based, connectionless client/server protocol. Though easily generalized, its implementation is specific to IMS in an MVS Sysplex environment. An important capability of OTMA is that existing IMS application programs can run without modification and interact with OTMA clients.

After an APPC call is issued by IMS from the IMS dependent region during syncpoint processing, transactions may hang. The inventors have determined that such hangs occur due to either a partner LU not issuing "confirmed", or a partner LU being terminated without VTAM on the APPC/MVS side not being informed. The symptom that is noticed is that the IMS/APPC conversation appears hung, and the IMS dependent region is waiting in the syncpoint processing. The wait state may tie up resources, thus preventing other IMS transactions from processing. When there is a large network involved, there has heretofore been no easy way to detect a hung LU and take it out the hung state. Furthermore, there has heretofore been no easy way either to detect or to free up the hung dependent region.

Also, a similar problem occurs with transactions hanging after an asynchronous XCF (Cross Coupling Facility) call issued by IMS from the dependent region during syncpoint processing. Normally, the reason for the hang is that the OTMA client is not issuing "confirmed". Here, again, there has heretofore been no simple way to free up the hung resources in IMS.

APPC/IMS Timeout Detection

The invention resides in a new method of processing that ensures that IMS itself will detect hang situations with APPC devices. The invention, more particularly, involves the following steps:

At startup time, IMS creates a new ITASK (an ITASK is similar to a process) that will check periodically if any IMS application program is in a wait for a response from an APPC device.

When IMS connects successfully to APPC/MVS, the ITASK gets posted and initializes itself.

The ITASK calculates the time it has to wait (sleep) before the next check occurs. This is done by finding out which application program is the closest to expire and calculating when this application program would exceed the time-out limit specified in the startup parameter. The ITASK adds 4 seconds to make sure that this application program's APPC call will be expired when the next check occurs. The minimum wait time for the checking by the detection process is 30 seconds. If there is no application program waiting to complete an APPC call the wait time is set to the maximum allowed wait time, which is defined as a startup parameter.

The ITASK sets itself into a wait (sends itself to sleep).

The ITASK gets started by IMS after the wait time expires.

The detection process now checks all the active application programs. If an application program is waiting for a response, the ITASK will calculate the wait time and compare it with the maximum wait time allowed, which is a startup parameter. If the specified time is exceeded, a warning message will be issued to make an operator aware of a possible hang situation. After checking all the application programs, the ITASK recalculates the ITASK wait time and waits.

To determine the waiting time of an application program, a time-stamp is written before the APPC call is issued. The time-stamp is cleared after APPC response comes back.

The time-out detection only works for implicit APPC transactions.

The foregoing will now be described with respect to FIGS. 1–3.

In FIG. 1, a step 40 indicated as IMS startup is taken. This step causes startup parameters to be read. In step 50, a particular parameter that indicates the maximum allowed program ($T_{max}$) wait time is read. In step 60, the ITASK is created, and knows the maximum allowed program wait time.

Figure 2:
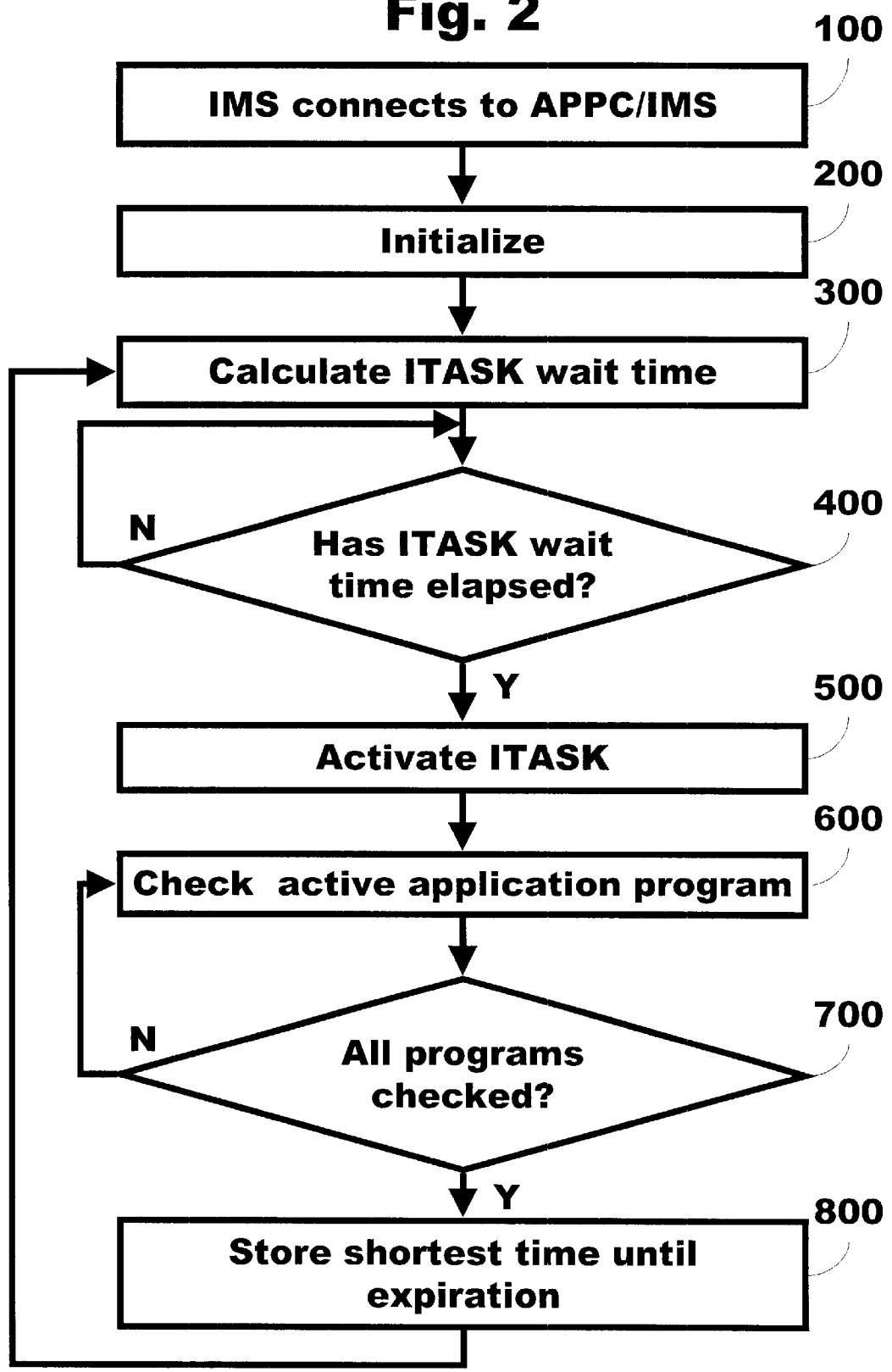
FIG. 2 shows another portion of the processing according to the invention.

Processing now continues as shown in FIG. 2. In FIG. 2, at step 100, IMS connects to APPC/IMS. Next, the ITASK is initialized.

In step 300, the ITASK calculates the ITASK wait time ($I_{wait}$). This may be accomplished in a number of ways. The very first wait time may be arbitrarily set, in a startup parameter, at 30 seconds. After the first wait time, the next wait time may be determined in a manner to be discussed below with respect to step 800.

Step 400 represents a wait state of the ITASK; processing continues to step 500 only after the wait time calculated in step 300 passes.

Once the wait time of the ITASK $I_{wait}$ elapses, the ITASK becomes active (step 500) and checks each active application program as shown in steps 600 and 700. Steps 600 and 700 represent an iteration in which all active programs are checked. Once all active programs are checked, processing continues to step 800.

The set of active programs may be understood to be n in number, and a given one of the active programs may be represented as $p^i$.

Figure 3:
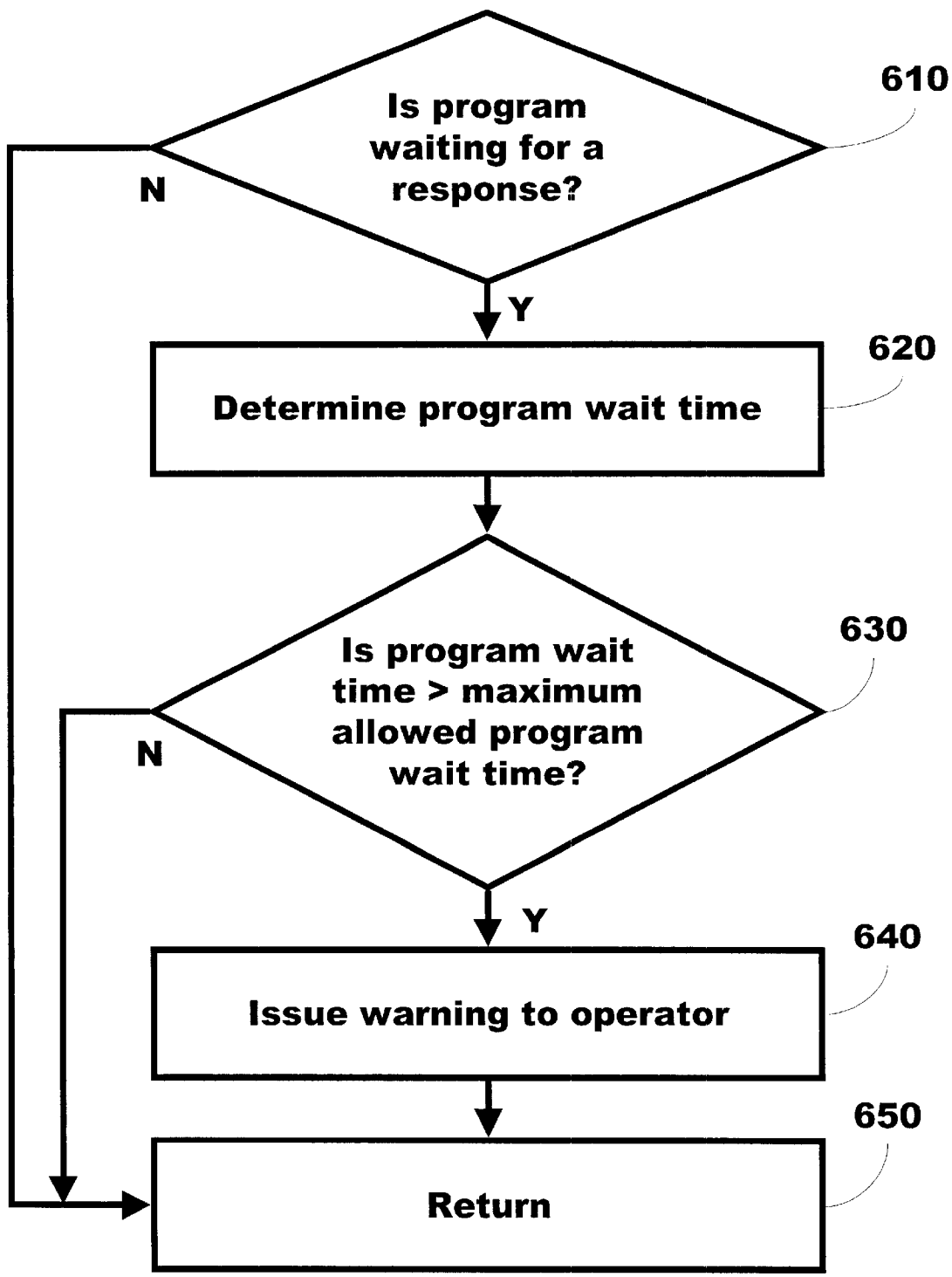
FIG. 3 shows a detailed view of one of the operations depicted in FIG. 2.
Figure 4:
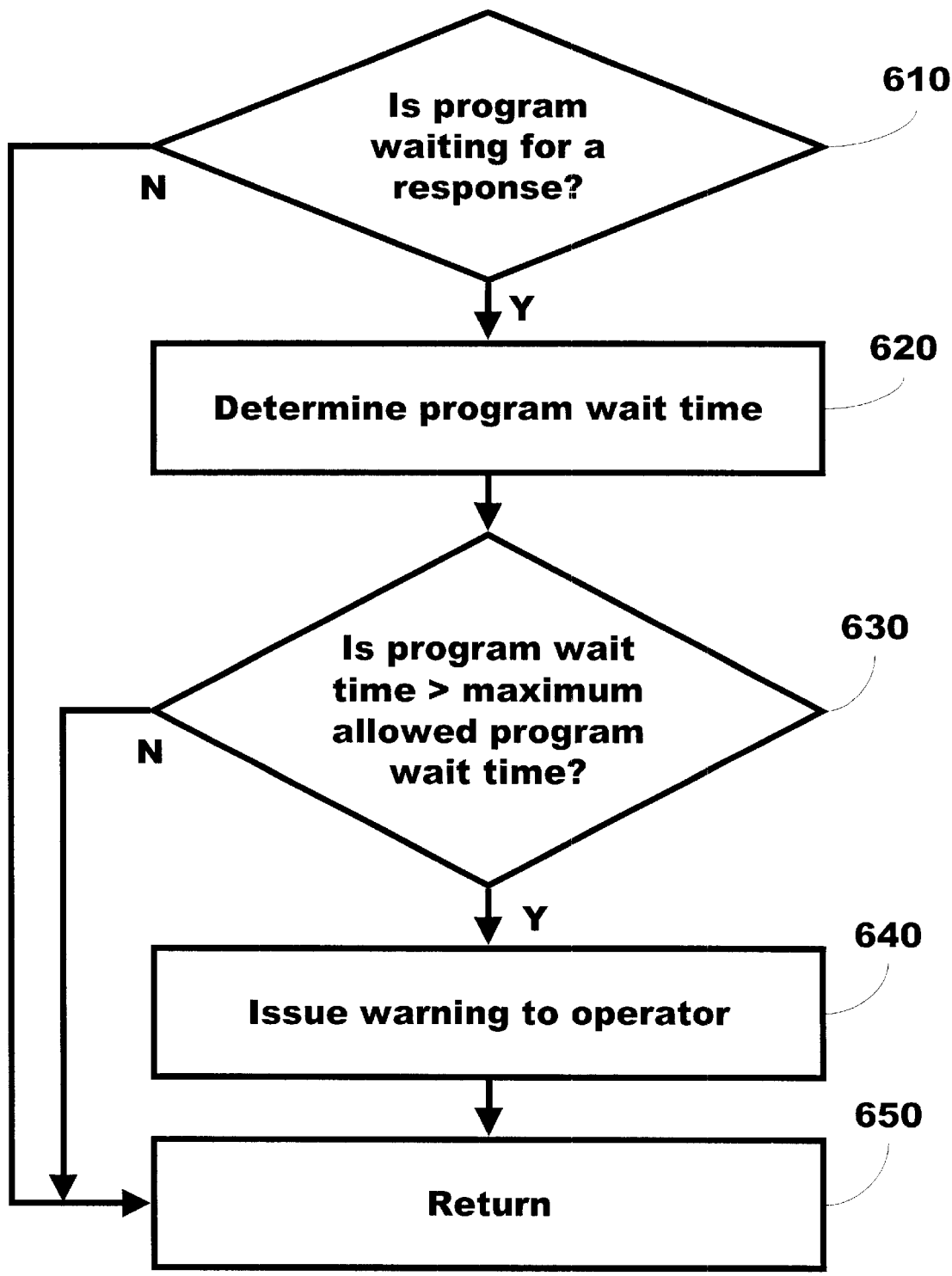

Turning now to FIG. 3, there will be described the processing involved with checking one active program $p^i$. In step 610, it is determined whether the active program is awaiting a response. If no response is being awaited, then there is no possibility that the transaction of the active program is hung, and so the scrutiny of the active program is ended with processing passing to step 650.

If the program is waiting for a response, processing continues to step 620. Another way of putting this is to say that the program is in a response wait state. In step 620, the amount of time the program has been waiting for a response is determined. This amount of time is the program wait time, which is not the same as the ITASK wait time computed in step 300. The program wait time relies on a time-stamp written by the active program before an APPC call is issued. This time-stamp is compared with the current time to determine the complete program wait time. This time-stamp is automatically cleared after the APPC response comes back. The time stamp of a given program may be said to correspond to the start time of the transaction for which the program is in a wait state. Of course, the time stamp may not reflect the precise start time, but it is taken so close to the start time of the transaction that any difference between the start time as time-stamped and the exact transaction start time is de minimis.

The program wait time is compared with the maximum allowed program wait time in step 630. It will be recalled that the maximum allowed program wait time was discussed with reference to step 50, above. When the program wait time (i.e., the length of time that the program has been waiting a response from an APPC call) exceeds the maximum allowed program wait time, it is assumed that the transaction is hung, and processing continues to step 640, in which the operator is apprised of the hang. When the program wait time is not greater than the maximum allowed program wait time, however, processing goes from step 630 to 650.

Step 640 may be understood to be a step of taking a remedial measure. A warning to the operator is thus a remedial measure. Other remedial measures are possible, such as deleting the transaction hung or the like.

At step 650, control is returned to the processing shown in FIG. 2, step 700. Once each active program is checked, processing continues to step 800. Step 800 relates to the time until expiration for the active programs. It will be understood that, for a set of I given active programs, each may be represented as $p^i$, and the time until expiration for each may be represented by:

$$T_e^i = T_{max} - (T_{current} - T_{stamp}^i)$$

where $T_e^i$ is the time until expiration for $p^i$;

$T_{max}$ is the maximum allowed program wait time;

$T_{current}$ is the current time; and $T_{stamp}^i$ is the time stamp for $p^i$.

Thus, for a given set of active programs 1 . . . n, the shortest time until expiration $T_e^{min}$ may be given by:

$$T_e^{min} = \min[T_e^1 \ldots T_e^n]$$

Above, it was mentioned with respect to step 300, that the first time the ITASK is activated, the ITASK wait time may be set to an arbitrary amount. Once each of the active programs has been scrutinized for hanging, however, it is more useful to dynamically set the ITASK wait time based on the prevailing conditions. In the preferred embodiment of the invention, the ITASK wait time $I_{wait}$ is usually set to $T_e^{min}+4$ seconds. This 4 seconds may be thought of as a predetermined offset interval, and may be changed depending on the nature of the transactions typical of the computing environment.

To avoid running the ITASK too frequently, however, a minimum ITASK wait interval may be specified. For example, in the preferred embodiment of the invention, the minimum ITASK wait interval $I_{wait}^{min}$ is is set to 30 seconds.

Thus, $I_{wait}$ will be the greater of $I_{wait}^{min}$ and $T_e^{min}+$four seconds, or:

$$I_{wait} = \max[(I_{wait}^{min}),(T_e^{min}+4)]$$

By way of this invention, therefore, there is provided a way to quickly detect and to warn of hung transactions. Of course, actions other than that shown in step 640 could be taken. In some situations, it might be appropriate to terminate tasks determined to be hung.

The $I_{wait}^{min}$ of 30 seconds, and the 4 seconds added to $T_e^{min}$ also are representative only, and may be varied without departing from the spirit of the invention. Likewise, other ways of determining $I_{wait}$ are possible and will present themselves to one familiar with this field. The disclosed embodiment is advantageous in that the $T_e^{min}$ is determined dynamically.

Also, calculating $T_e^{min}$ after checking all of the programs avoids the problem of an important amount of time passing between checking $p^1$, all of the other programs, and, eventually, $p^n$.

It will be appreciated that the above-identified invention in all of its embodiments may be embodied in a computer system that contains hardware and software enabling it to perform the hung transaction detecting operations. Similarly, the above-identified invention may be embodied in a computer program product, as will now be explained.

On a practical level, the software that enables the computer system to perform the above-identified approach and operations of the invention, is supplied on any one of a variety of media. Furthermore, the actual implementation of the approach and operations of the invention are actually statements written in a programming language. Such programming language statements, when executed by a computer, cause the computer to act in accordance with the particular content of the statements. Furthermore, the software that enables a computer system to act in accordance with the invention may be provided in any number of forms including, but not limited to, original source code, assembly code, object code, machine language, compressed or encrypted versions of the foregoing, and any and all equivalents.

One of skill in the art will appreciate that "media", or "computer-readable media", as used here, may include a diskette, a tape, a compact disc, an integrated circuit, a cartridge, a remote transmission via a communications circuit, or any other similar medium useable by computers. For example, to supply software for enabling a computer system to operate in accordance with the invention, the supplier might provide a diskette or might transmit the software in some form via satellite transmission, via a direct telephone link, or via the Internet.

Although the enabling software might be "written on" a diskette, "stored in" an integrated circuit, or "carried over" a communications circuit, it will be appreciated that, for the purposes of this application, the computer usable medium will be referred to as "bearing" the software, or the software will be referred to as being "on" the medium. Thus, the term "bearing" is intended to encompass the above and all equivalent ways in which software is associated with a computer usable medium.

For the sake of simplicity, therefore, the term "program product" is thus used to refer to a computer useable medium, as defined above, which bears in any form of software to enable a computer system to operate according to the above-identified invention.

Thus, the invention is also embodied in a program product bearing software which enables a computer to perform hung transaction detection according to the invention.

It will likewise be appreciated that the computer hardware upon which the invention is effected contains one or more processors, operating together or substantially independently, and includes memory for storing the instructions and calculations necessary to perform the invention.

Modifications to this disclosed embodiment will occur to those of skill in the art, and thus the scope of this invention is to be construed in accordance with the appended claims and not to just the specificities of the disclosed embodiment.

We claim:

1. A method for detecting hung transactions of active programs, said active programs including a given active program, comprising:
   creating a detection process;
   determining a detection process wait time for said detection process;
   activating said detection process after said detection process wait time lapses;
   checking each of said active programs, using said detection process, to detect one of said hung transactions, including:
      determining whether said given active program is in a response wait state,
      when said given active program is in said response wait state, determining a respective program wait time of said given active program, and
      when said respective program wait time exceeds a maximum allowed program wait time, indicating said given active program as said detected one of said hung transactions; and
   when said detection process indicates one of said hung transactions is detected, taking a remedial action.

2. The method for detecting hung transactions of active programs as set forth in claim 1, further comprising:
   determining said respective program wait time based on a difference between a current time and a time stamp corresponding to a transaction start time for said given active program.

3. A method for detecting hung transactions of active programs, said active programs including a given active program, comprising:
   creating a detection process;
   determining a detection process wait time for said detection process;
   activating said detection process after said detection process wait time lapses;
   checking each of said active programs, using said detection process, to detect one of said hung transactions; and
   when said detection process indicates one of said hung transactions is detected, taking a remedial action;
   wherein said detection process wait time is determined based on a shortest time until expiration of all of said active programs in a response wait state.

4. A method for detecting hung transactions of active programs, said active programs including a given active program, comprising:
   creating a detection process;
   determining a detection process wait time for said detection process;
   activating said detection process after said detection process wait time lapses;
   checking each of said active programs, using said detection process, to detect one of said hung transactions; and
   when said detection process indicates one of said hung transactions is detected, taking a remedial action;
   wherein:
      said active programs are 1 . . . n in number;
      a respective time until expiration for an ith one of said n active programs is given by:

$$T_e^i = T_{max} - (T_{current} - T_{stamp}^i)$$

where
   $T_e^i$ is said respective time until expiration;
   Tmax is a maximum allowed program wait time;
   Tcurrent is a current time;
   $T_{stamp}^i$ is a time stamp corresponding to a transaction start time for said ith one of said n active programs;
for said n active programs, a shortest time until expiration $T_e^{min}$ is given by:

$$T_e^{min} = min[T_e^1 \ldots T_e^n];$$

and said detection process wait time is the greater of:
   a minimum detection process wait interval, and $T_e^{min}$ incremented by a predetermined offset interval.

5. A computer system adapted to detect hung transactions of active programs, said active programs including a given active program, comprising:
   a processor, and
   a memory including software instructions adapted to enable the computer system to perform the steps of:
   creating a detection process;
   determining a detection process wait time for said detection process;
   activating said detection process after said detection process wait time lapses;
   checking each of said active programs, using said detection process, to detect one of said hung transactions, including:
      determining whether said given active program is in a response wait state,
      when said given active program is in said response wait state, determining a respective program wait time of said given active program, and
      when said respective program wait time exceeds a maximum allowed program wait time, indicating said given active program as said detected one of said hung transactions; and
   when said detection process indicates one of said hung transactions is detected, taking a remedial action.

6. The computer system adapted to detect hung transactions of active programs as set forth in claim 5, wherein said memory further includes software instructions adapted to enable the computer system further to determine said respective program wait time based on a difference between a current time and a time stamp corresponding to a transaction start time for said given active program.

7. A computer system adapted to detect hung transactions of active programs, said active programs including a given active program, comprising:
  a processor, and
  a memory including software instructions adapted to enable the computer system to perform the steps of:
    creating a detection process;
    determining a detection process wait time for said detection process;
    activating said detection process after said detection process wait time lapses;
    checking each of said active programs, using said detection process, to detect one of said hung transactions; and
    when said detection process indicates one of said hung transactions is detected, taking a remedial action;
  wherein said memory further includes software instructions adapted to enable the computer system further to base said detection process wait time on a shortest time until expiration of all of said active programs in a response wait state.

8. A computer system adapted to detect hung transactions of active programs, said active programs including a given active program, comprising:
  a processor, and
  a memory including software instructions adapted to enable the computer system to perform the steps of:
    creating a detection process;
    determining a detection process wait time for said detection process;
    activating said detection process after said detection process wait time lapses;
    checking each of said active programs, using said detection process, to detect one of said hung transactions; and
    when said detection process indicates one of said hung transactions is detected, taking a remedial action;
  wherein said memory further includes software instructions adapted to enable the computer system further to operate so that:
    said active programs are 1 . . . n in number;
    a respective time until expiration for an ith one of said n active programs is given by:

$$T_e^i = T_{max} - (T_{current} - T_{stamp}^i)$$

where
    $T_e^i$ is said respective time until expiration;
    Tmax is a maximum allowed program wait time;
    Tcurrent is a current time;
    $T_{stamp}^i$ is a time stamp corresponding to a transaction start time for said ith one of said n active programs;
    for said n active programs, a shortest time until expiration $T_e^{min}$ is given by:

$$T_e^{min} = \min[T_e^1 \ldots T_e^n];$$

and said detection process wait time is the greater of:
      a minimum detection process wait interval, and
      $T_e^{min}$ incremented by a predetermined offset interval.

9. A computer program product for enabling a computer to detect hung transactions of active programs, said active programs including a given active program, said program product comprising:
  software instructions for enabling the computer to perform predetermined operations, and
  a computer readable medium bearing the software instructions;
  the predetermined operations including the steps of:
    creating a detection process;
    determining a detection process wait time for said detection process;
    activating said detection process after said detection process wait time lapses;
    checking each of said active programs, using said detection process, to detect one of said hung transactions, including:
      determining whether said given active program is in a response wait state,
      when said given active program is in said response wait state, determining a respective program wait time of said given active program, and
      when said respective program wait time exceeds a maximum allowed program wait time, indicating said given active program as said detected one of said hung transactions; and
    when said detection process indicates one of said hung transactions is detected, taking a remedial action.

10. The computer program product for enabling a computer to detect hung transactions of active programs as set forth in claim 9, wherein said determining of said respective program wait time is based on a difference between a current time and a time stamp corresponding to a transaction start time for said given active program.

11. A computer program product for enabling a computer to detect hung transactions of active programs, said active programs including a given active program, said program product comprising:
  software instructions for enabling the computer to perform predetermined operations, and
  a computer readable medium bearing the software instructions;
  the predetermined operations including the steps of:
    creating a detection process;
    determining a detection process wait time for said detection process;
    activating said detection process after said detection process wait time lapses;
    checking each of said active programs, using said detection process, to detect one of said hung transactions; and
    when said detection process indicates one of said hung transactions is detected, taking a remedial action;
  wherein said step of determining said detection process wait time is performed so as to base said detection process wait time on a shortest time until expiration of all of said active programs in a response wait state.

12. A computer program product for enabling a computer to detect hung transactions of active programs, said active programs including a given active program, said program product comprising:
  software instructions for enabling the computer to perform predetermined operations, and
  a computer readable medium bearing the software instructions;
  the predetermined operations including the steps of:
    creating a detection process;
    determining a detection process wait time for said detection process;
    activating said detection process after said detection process wait time lapses;

checking each of said active programs, using said detection process, to detect one of said hung transactions; and when said detection process indicates one of said hung transactions is detected, taking a remedial action;

wherein said software instructions enable said computer to perform so that:

said active programs are 1 ... n in number;

a respective time until expiration for an ith one of said n active programs is given by:

$$T_e^i = T_{max} - (T_{current} - T_{stamp}^i)$$

where $T_e^i$ is said respective time until expiration;

Tmax is a maximum allowed program wait time;

Tcurrent is a current time;

$T_{stamp}^i$ is a time stamp corresponding to a transaction start time for said ith one of said n active programs;

for said n active programs, a shortest time until expiration $T_e^{min}$ is given by:

$$T_e^{min} = \min[T_e^1 \ldots T_e^n];$$

and said detection process wait time is the greater of:

a minimum detection process wait interval, and $T_e^{min}$ in incremented by a predetermined offset interval.

* * * * *